(12) United States Patent
BeSerra et al.

(10) Patent No.: US 9,984,021 B1
(45) Date of Patent: May 29, 2018

(54) LOCATION-AWARE SELF-CONFIGURATION OF A PERIPHERAL DEVICE

(71) Applicant: Amazon Technologies, Inc., Seattle, WA (US)

(72) Inventors: Christopher James BeSerra, Federal Way, WA (US); Adi Habusha, Moshav Alonei Abba (IL); Ziv Harel, Kibbutz Megiddo (IL); Nafea Bshara, San Jose, CA (US); Hani Ayoub, Majd al-Krum (IL); Darin Lee Frink, Lake Tappas, WA (US)

(73) Assignee: Amazon Technologies, Inc., Seattle, WA (US)

( * ) Notice: Subject to any disclaimer, the term of this patent is extended or adjusted under 35 U.S.C. 154(b) by 277 days.

(21) Appl. No.: 14/867,431

(22) Filed: Sep. 28, 2015

(51) Int. Cl.
*G06F 13/42* (2006.01)
*G06F 13/38* (2006.01)
*G06F 13/10* (2006.01)
*G06F 13/40* (2006.01)

(52) U.S. Cl.
CPC .......... *G06F 13/385* (2013.01); *G06F 13/102* (2013.01); *G06F 13/4054* (2013.01); *G06F 13/4221* (2013.01)

(58) Field of Classification Search
CPC .. G06F 13/364; G06F 13/385; G06F 13/4221; G06F 13/102
See application file for complete search history.

(56) References Cited

U.S. PATENT DOCUMENTS

| | | | | |
|---|---|---|---|---|
| 5,987,568 | A | * 11/1999 | Adams | G06F 9/3877 711/102 |
| 6,397,327 | B1 | * 5/2002 | Klebanov | G06F 9/4411 710/8 |
| 2010/0235833 | A1 | * 9/2010 | Huang | G06F 21/575 718/1 |
| 2013/0041808 | A1 | * 2/2013 | Pham | H04L 65/1083 705/39 |
| 2013/0143600 | A1 | * 6/2013 | Jan | H04W 64/006 455/456.3 |
| 2016/0274923 | A1 | * 9/2016 | Harriman | G06F 1/3203 |
| 2016/0335876 | A1 | * 11/2016 | Verma | G01S 11/06 |
| 2016/0359659 | A1 | * 12/2016 | MacGougan | H04L 41/0672 |

* cited by examiner

*Primary Examiner* — Steven Snyder
*Assistant Examiner* — Christopher A Daley
(74) *Attorney, Agent, or Firm* — Kilpatrick Townsend & Stockton LLP

(57) ABSTRACT

Provided are systems and methods for a location-aware, self-configuring peripheral device. In some implementations, the peripheral device may include two or more personalities. In these implementations, a personality enables the peripheral device to provide a service. In some implementations, the peripheral device may be configured to receive a configuration cycle. In some implementations, the peripheral device may further select a personality from among two or more personalities. The peripheral device may use information derived from the configuration cycle to make this selection. Selecting a personality may further include configuring the peripheral device according to the selected personality.

20 Claims, 8 Drawing Sheets

LOCATION-AWARE SELF-CONFIGURATION OF A PERIPHERAL DEVICE

BACKGROUND

Computing systems may include peripheral devices. Peripheral devices may add to or change the functionality of the computing system. In many cases, peripheral devices are connected to the computing system using an interconnect. The interconnect may implement a standard bus protocol, such as any of the Peripheral Component Interconnect (PCI) family of bus protocols.

Peripheral devices may be multi-function devices. That is, the peripheral device may be able to provide more than one service, such as for example a network interface and a mass storage controller. In some cases, the peripheral device may be configured to provide only one of its services to the computing system to which it is attached. In other cases, the peripheral device may provide more than one of its functions to the computing system.

BRIEF DESCRIPTION OF THE DRAWINGS

Various embodiments in accordance with the present disclosure will be described with reference to the drawings, in which.

DETAILED DESCRIPTION

Figure 1:
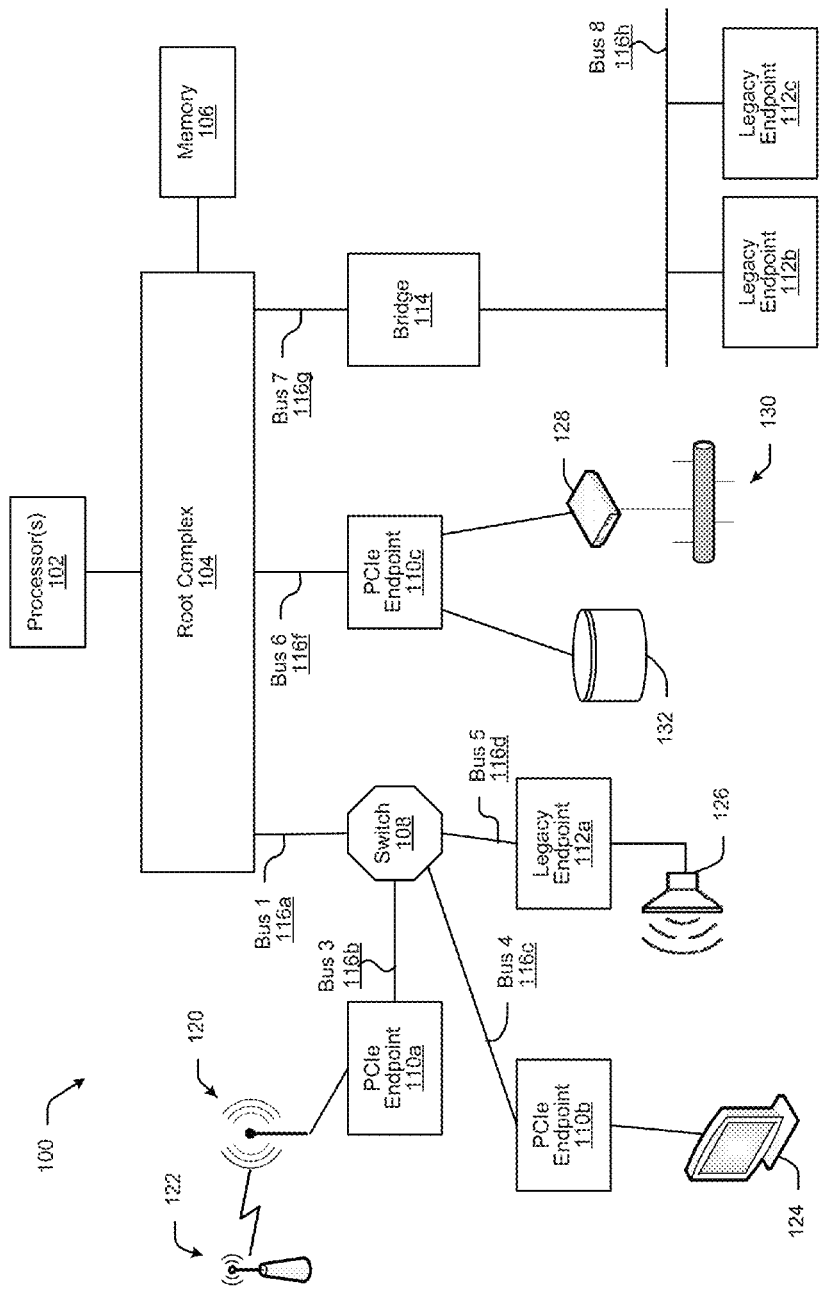
FIG. 1 illustrates an example of a computing system that includes multiple peripheral devices.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Computing systems may include peripheral devices. Peripheral devices may add to or change the functionality of the computing system. Examples of peripheral devices include storage devices, displays, speakers, and wired and/or wireless network adapters, among others. In many cases, peripheral devices are connected to the computing system using an interconnect. The interconnect may implement a standard bus protocol, such as any of the PCI family of bus protocols. Transactions transferred over the interconnect typically include at least an address, designating a destination for the transaction. Write transactions may also include data to write to the address.

A computing system may use multiple peripheral devices to provide different services. For example, the computing system may provide a network interface and a mass storage controller. While it is possible to construct the computing system with different peripheral devices (e.g., one that only supplies the network interface and one that only provides the mass storage controller), a multi-function peripheral device may provide a more convenient solution. For example, a multi-function peripheral device may allow a system administrator to acquire the devices from one vendor. Additionally, the system administrator need only learn the functionality and configuration requirements of one device. When building a computing system, the system administrator may only need to decide which service a specific device is to provide.

Various methods may be used to select which of multiple services a multi-function peripheral device will provide. For example, the multi-function peripheral device may be provided with mechanical controls, such as dip switches or jumpers, which control the function selection. Alternatively or additionally, the peripheral device may include a flash memory, and the peripheral device's configuration may be written into the flash memory prior to the device's installation in the system. As another example, the computing system may provide different slots for different functionality. For example, one computing system may provide a slot A for a network interface, which will provide access only to the network interface service of the multi-function peripheral device. Another computing system may also provide a slot A, in this case for a mass storage controller, which will provide access only to the mass storage controller service of the multi-function peripheral device. Alternatively or additionally, the computing system may include software that determines which service or services provided by a multi-function peripheral device will be used. The software may inform one computing system to access only the network interface service while the software may inform another computing system to access only the mass storage controller service.

While any of these methods may result in a properly configured peripheral device, the methods may place limitations on the design of the computing system and/or on the administration of the system. For example, implementations that use the computing system's hardware and/or software to select a service may mean that the computing system may not be "symmetric;" that is, it may not be possible to provision the computing system with multiple, identical servers. Each server-system may require differently configured slots and/or software. As another example, when the peripheral device may include mechanical controls, the system administrator may need to keep track of which device is providing which services. For example, in one server, the device attached to slot A may be a network interface, while in another server, the device attached to slot A may be a mass storage controller.

A location-aware, multi-function peripheral device that is capable of self-configuration may provide a potentially more efficient and possibly less error-prone solution. By being aware of its location—that is, where the device is attached to the computing system—the multi-function peripheral device may be operable to adopt a different "personality," based on its location. A personality in this context describes the configuration of the location-aware, multi-function peripheral device, and the service or services that may be provided when the peripheral device configures itself according to the given personality. For example, when the multi-function peripheral device is attached to slot A of the computing system, the device may adopt a personality that includes a network interface service. Furthermore, the same device, when attached to slot B, may adopt a personality that includes a mass storage service. In either case, the device may further configure itself according to the selected personality. In some implementations, the personality selection and self-configuration may occur before or concurrent with the enumeration processes, so that the multi-function peripheral device is prepared to respond to configuration access requests that may occur during enumeration.

A location-aware, self-configuring peripheral device thus may avoid the need to manually and mechanically configure the device. Furthermore, a location-aware, self-configuring peripheral device may provide predictability, because the device, when attached to the same slot in different servers, can be expected to always provide the same functionality. Additionally, a location-aware, self-configuring peripheral device may allow for the configuring of symmetric systems, where each server can be identically provisioned but have use of different peripheral devices because of the server's location in the system.

FIG. 1 illustrates an example of a computing system 100 that includes multiple peripheral devices. Peripheral devices may include hardware devices and/or devices that include a combination of hardware and software that can be attached to a computing system to add functionality to the computing system 100. Examples of peripheral devices include storage devices, displays, speakers, wired and/or wireless network adapters, adapters to provide additional ports to the system (such as serial and/or parallel ports), bridges, hubs, and/or switches that provide ports for additional peripheral devices, and others. Generally, peripheral devices can be connected and disconnected from the computing system to change the functionality of the system. In some cases, the computing system must be powered down for a peripheral device to be added or removed. In other cases, the peripheral device can be attached or removed while the computer system is powered on (often referred to as "hot-swapping" or "hot-plugging").

The example in FIG. 1 illustrates a computing system 100 that includes peripheral devices that implement one or more variations of the Peripheral Component Interconnect (PCI) standard bus protocols. A bus is a communication channel that transfers data within a computing system, or between a computing system and other devices. A standardized bus protocol is a data transfer protocol for which a specification has been defined and adopted by various manufacturers. Manufacturers ensure that compliant devices are compatible with computing systems implementing the bus protocol, and vice versa. PCI describes a family of related, standardized bus protocols. PCI includes the original PCI standard, PCI-eXtended (PCI-X), Accelerated Graphics Port (AGP), and PCI Express (PCIe, also referred to as PCI-XP). The term "PCI" may be used to describe any protocol in the PCI family of bus protocols. In the example shown in FIG. 1, PCI is provided as an example of a bus protocol that can be implemented by a computing system to connect to peripheral devices. A computing device can use other bus protocols, such as for example, Industry Standard Architecture (ISA), Extended ISA (EISA), Video Electronics Standards Association (VESA), Micro Channel, and any of the Advanced Technology Attachment (ATA) family of protocols, among others. The illustrated example can also be implemented with a combination of standardized bus protocols, proprietary bus protocols, and/or with a combination of standardized and proprietary bus protocols.

The example computing system 100 may include one or more processors 102, a root complex 104, a memory subsystem 106, a switch 108, a bridge 114, and a number of peripheral devices. In this example, the peripheral devices include PCIe endpoints 110a-c and legacy endpoints 112a-c. The processors 102 may be general purpose computing devices such as are manufactured by Intel®, AMD®, ARM®, Qualcomm®, an others. The processors 102 are generally capable of executing software code. A processor may include multiple processing cores.

The root complex 104 may be a hardware device or a hardware and software device that connects the processors 102 and the memory subsystem 106 to the peripheral devices. The peripheral devices may be connected directly to the root complex 104. For example, the PCIe endpoint 110c is connected directly to the root complex 104. Alternatively or additionally, the peripheral devices may be connected to the root complex 104 through a switch 108. A bridge 114 may also be connected to the root complex 104. The root complex 104 may forward transactions to the processors 102 and direct responses from the processors 102 back to the peripheral devices. The root complex 104 may further generate transactions on behalf of the processors 102, and forward responses to those transactions back to the processors 102. In some cases, the root complex 104 may also route transactions from one peripheral device to another, and/or between peripheral devices, switches, and bridges. The root complex 104 may provide services for the computer system 100, such as a hot plug controller, a power management controller, an interrupt controller, and/or error detection and reporting. In some implementations, the root complex 104 may be implemented as part of a host system that includes one or more integrated processors and memory.

The memory subsystem 106 provides temporary or long-term storage for data that may be used by the computing system 100. The memory subsystem 106 may include Dynamic Random Access Memory (DRAM), Synchronous DRAM (SDRAM), and/or Double Data Rate (DDR), among others. In some cases, the memory subsystem 106 may also include Read Only Memory (ROM), such as Programmable Read Only Memory (PROM), Erasable Programmable Read Only Memory (EPROM), Electrically Erasable Programmable Read Only Memory (EEPROM), and/or Flash EEPROM, among others. In some implementations, the root complex 104 may include a memory controller to manage transactions to and from the memory subsystem 106. In other implementations, the processors 102 may include a memory controller. Alternatively or additionally, the computing system 100 may include an external memory controller in communication with either the processors 102, the root complex 104, or both the processors 102 and the root complex 104, and the memory subsystem 106.

Peripheral devices are devices that can generate and/or respond to data transactions. For example, peripheral devices may be "requesters" (transaction generators) and/or "completers" (transaction responders). In PCI implementations, peripheral devices may include PCIe endpoints, that is, peripheral devices that are configured to communicate using the PCIe protocol. Other peripheral devices may be legacy endpoints, that is, peripheral devices that are configured to communicate using other PCI protocols, such as the original PCI standard or PCI-X. Though not illustrated here, the computing system 100 may further include peripheral devices that implement another bus standard, such as for example Small Computer System Interface (SCSI), Serial ATA (SATA), or Parallel ATA (PATA), among others.

The switch 108 functions as a multi-port connecter between various devices, including the root complex 104, peripheral devices, and possibly other switches and bridges. The switch 108 may route transactions between any of the devices connected to it. For example, the switch 108 may route transactions between the PCIe endpoints 101a-b and the legacy endpoint 112a, and between the various endpoints 110a-b, 112a and the root complex 104. The switch 108 may also provide arbitration to prioritize incoming and outgoing transactions. Devices connected to the switch 108 may treat the switch 108 as another requester and/or completer. Though not illustrated here, switches can also be connected to other switches to further expand the number of peripheral devices that can be connected to the computing system 100.

The bridge 114 may provide connectivity to other busses or switching fabrics. The other busses or switching fabrics may implement a PCI variant or another protocol. For example, in the example of FIG. 1, the bridge 114 provides connectivity to a bus implementing the original PCI standard. The bridge 114 may include mechanisms to translate from one bus protocol, such as the original PCI standard, to another protocol, such as PCIe.

Components in the computing system 100 may be connected through a shared bus. For example, in the illustrated example the legacy endpoints 112b-c are connected to a shared PCI bus 116h. Alternatively or additionally, peripheral devices may be connected to the computing system 100 in a switching fabric topology. The interconnected devices illustrated in FIG. 1, including the root complex 104, the switch 108, the bridge 114, and the PCIe endpoints 1101-c, form an example of a switching fabric. A switching fabric topology may include point-to-point connections between the devices connected to the fabric, and may include a routing system for passing messages between the devices. In a switching fabric, transactions may be spread across multiple physical links. In the example of FIG. 1, the switch 108 is connected to the root complex 104 with Bus 1 116a and the PCIe endpoint 110c is connected to the root complex with Bus 6 116f. Similarly, the bridge 114 is connected to the root complex with Bus 7 116g. Each of the PCIe endpoints 110a-b and the legacy endpoint 112a are also connected to the switch 108a with individual busses 116b-d. The connections between each of the root complex 104, the switch 108, the bridge 114, the PCIe endpoints 110a-c and the legacy endpoint 112a are point-to-point because each of the busses 116a-g are not shared with another device. Furthermore, a packet directed from one device to another (for example, from the root complex 104 to the PCIe endpoint 110a) is routed directly to its destination.

In some implementations, the connections between the devices in the computing system 100 may be numbered. For example, in the illustrated example, the connection between the switch 108 and the root complex 104 is labeled Bus 1 108 (Bus 0 may be internal to the root complex 104). Similarly, each of the busses connecting the PCIe endpoints 110a-b and the legacy endpoint 112a to the switch 108 are labeled Bus 3 116b, Bus 4 116c, and Bus 5 116d, respectively (Bus 2 may be internal to the switch 108). Furthermore, the connection between the root complex 104 and the PCIe endpoint 110c may be labeled Bus 6 116f, while the connection between the root complex and the bridge 114 may be labeled Bus 7 116g. Finally, the shared bus downstream from the bridge 114 may be labeled Bus 8 116h. In most cases the numbering of the busses is arbitrary, though bus numbers may generally be assigned in a logical fashion. For example, Bus 0 may be located within the root complex 104, and the bus label may increment as the distance between the bus and the root complex 104 increases.

As noted above, peripheral devices may add to and/or modify the functionality of the computing system 100. For example, one PCIe endpoint 110a may implement a Wi-Fi adapter 120. Using the Wi-Fi adapter 120, the computing system 100 may be able to communicate wirelessly with a wireless access point 122, and thereby access a network. As another example, another PCIe endpoint 110b may implement a video card. A video card may include a port to connect a monitor 124 or other display device. As a further example, the computing system 100 may include a legacy endpoint 112a that implements a sound card. A sound card may include a port or jack that accepts a plug for a speaker 126 or other audio output device.

In some cases, a PCIe endpoint may be a multi-function device, that is, a device that provides the services of multiple devices. For example, the PCIe endpoint 110c may include an Ethernet adapter, and provide a connection to a gateway device 128, such as a DSL or cable modem. The PCIe endpoint 110c may also include a storage adapter, and provide a connection to a storage device 132. The one PCIe endpoint 110c thus may provide access to a network 130, as well as access to a storage device 132. The hardware and/or software components in the peripheral device that provide the services of, for example, a network interface or a storage controller may be called a "function." In the context of PCI devices, the terms "function" and "service" may be synonymous, though in other contexts this is not necessarily the case. Types of functions that may be provided by a peripheral device include, for example, mass storage controllers, network controllers, display controllers, multimedia devices, memory controllers, bridges, input devices docking stations, serial bus controllers, wireless controllers, satellite communications controllers, and encryption/decryption controllers, among others. In some implementations, functions can be added to a peripheral device, for example by connecting daughter cards or external devices to expansion slots or external ports on the peripheral device. In some implementations, a multi-function PCI device may provide up to eight separate functions. In many implementations, the functions provided by a peripheral device may be identified by a function number. For example, Function 0 of the PCIe endpoint 110c may be a mass storage controller, while Function 1 may be a network interface.

When a computing system such as computing system 100 illustrated in FIG. 1 initially powers up, the processors 102 may be unaware of any peripheral devices that are connected to the system. The processors 102 may be aware of the root complex 104, and possibly also that the root complex 104 is connected to one or more busses. To learn about the rest of the system, the processors 102 may execute a process to scan and configure the system. This process may be referred to as an enumeration process. The specific process of scanning for, locating, and identifying peripheral devices may be called discovery or discovering. During an enumeration process, software executing on the processors 102 may first scan each of the busses 116a, 116f, 116g connected to the root complex 104, and identify the switch 108, the PCIe endpoint 110c, and the bridge 114. Upon discovering the switch 108, the processors 102 may next scan the busses 116b-d connected to the switch 108. The processors 102 thereby discover the PCIe endpoints 110a-c and the legacy endpoint 112a. Upon discovering the bridge 114, the processors 102 may also scan Bus 8 116h; however, the bridge 114 may translate the scanning instructions to the protocol implemented by Bus 8 116h.

While scanning the busses, or possibly after, the processors 102 may also transmit configuration transactions to each of the devices it discovers. Configuration may include, for example, assigning one or more address spaces. For example, PCI devices typically include one or more of a memory address space and/or an I/O address space. Each of these address spaces may be subdivided into multiple blocks. These address spaces, or address space blocks, may each be assigned a base address, where the base address establishes the region of memory that is assigned to the address space. In some implementations, these base addresses may be stored in configuration registers in a configuration space included in a device. Software executing on the processors 102 may be responsible for managing all available memory, and, for example, ensuring that no two devices are assigned overlapping memory regions. Alternatively or additionally, memory may be managed by a memory controller.

Configuration may further include programming information, such as a bus number and/or a device number, into configuration registers included in the devices. During configuration, the processors 102 may also read information from configuration registers. For example, the PCIe endpoint 110c may include a configuration register that indicates that it has two functions. The PCIe endpoint 110c may further include separate configuration registers for each function. Each function's configuration registers may further include information that indicates the capabilities of each function. For example, a configuration register may indicate that Function 0 is a mass storage controller, and another configuration register may indicate that Function 1 is a network interface. In most implementations, configuration registers are included in the hardware of a device.

In some implementations, the switch 108 and the bridge 114 also include a configuration space with configuration registers. In such implementations, the processors 102 may discover the switch and bridge functionality by reading configuration registers in the switch 108 and the bridge 114. The switch 108 and the bridge 114 may also be configured by the processors 102, for example with bus and device numbers.

Figure 2:
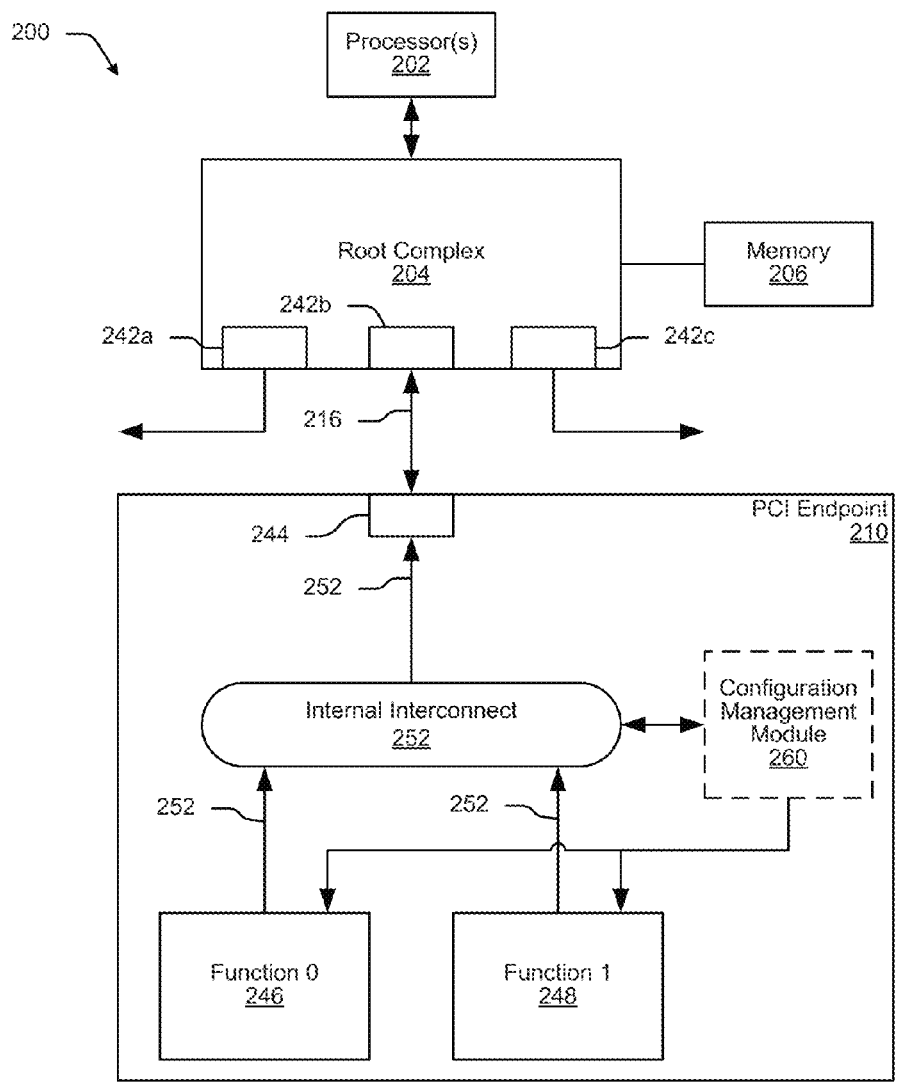
FIG. 2 illustrates an example of a computing system including at least one PCI endpoint.

FIG. 2 illustrates an example of a computing system 200 including at least one PCI endpoint 210. FIG. 2 further illustrates an example of the internal components and operation of the PCI endpoint 210. In this example, the PCI endpoint 210 is in communication with a root complex 204 over a PCI interconnect 216. The root complex 204 may be in communication with one or more processors 202 and a memory subsystem 206. The root complex 204 may include one or more ports 242a-c. These ports 242a-c may be connected, using additional PCI interconnects, to PCI switches, bridges, and endpoints, including the illustrated PCI endpoint 210. The root complex 204 may route transactions between the processors 202 and any of the endpoints, switches, or bridges, or between the endpoints, switches, and bridges themselves. In this example, PCI is used as an example of a bus protocol that may be implemented by a computing system to connect to peripheral devices. It is understood that the example illustrated in FIG. 2 may apply to other bus protocols that may be used to connect peripheral devices to a computing system.

The processors 202 may be general purpose computing devices that are generally capable of executing software code. A processor may include multiple processing cores.

The memory subsystem 206 provides temporary or long-term storage for data that may be used by the computing system 200.

The PCI endpoint 210 in this example includes a port 244, two functions 246, 248, and an internal interconnect 252 that connects the functions 246, 248 to the port 244. The PCI endpoint 210 may also include an optional configuration management module 260.

The port 244 may include a physical interface for connecting to a cable, socket, port, or other connection to the PCI interconnect 216. The port 244 may further include hardware and/or software to manage incoming and outgoing transactions. The port 244 may translate an internal transaction from the functions 246, 248 into a PCI transaction for transmission over the PCI interconnect 216. The port 244 may further translate transactions received over the PCI interconnect 216 for transfer over the internal interconnect 252 to the functions 246, 248.

The PCI endpoint 210 in this example includes two functions 246, 248. The functions 246, 248 may include hardware and/or software that provide a service for the peripheral device. A service in this context describes the operations and capabilities of the PCI endpoint 210, and the functionality the PCI endpoint 210 provides to the computing system 200. For example, in cases where the PCI endpoint 210 is a mass storage controller, Function 0 246 may include the hardware and/or software to provide mass storage controller functionality, including providing communication with one or more storage devices. As another example, in cases where the PCI endpoint 210 is also a network interface, Function 1 248 may include the hardware and/or software to provide network interface functionality, including providing communication with a network. Two functions are provided as an example. In various implementations, a PCI endpoint may include only one function, or more than two functions. A PCI endpoint that includes more than one function may be referred to as a multi-function device.

The functions 246, 248 may communicate with the port 244 over an internal interconnect 252. The internal interconnect 252 may be implemented using a standard bus protocol, such as Coherent Hub Interface (CHI), Advanced eXtensible Interface (AXI), Advanced High-Performance Bus (AHB), or the like. The internal interconnect 252 may also be implemented using a proprietary bus protocol. The protocols that may be implemented by the internal interconnect 252 typically define a transaction format. A transaction format typically includes at least an address, indicating the target of the transaction, and a transaction type, such as read or write. Write transactions may further include data. A transaction may include other information that either further identifies the target of the transaction, and/or provides further details about a data read or data write.

In some implementations, the PCI endpoint 210 may include a configuration management module 260. The configuration management module 260 may monitor inbound transactions, such as configuration read and write transactions. The configuration management module 260 may detect configuration information provided to the PCI endpoint 210. In some cases, the configuration management module 260 may use the detected configuration information to configure one or both of the functions 246, 248. In some cases, the configuration management module 260 may provide configuration information. For example, the configuration management module 260 may respond to configuration reads directed to one of the functions 246, 248 and provide the requested information, or may provide alternate information.

I. Location-Aware Self-Configuration

A computing system may use multiple peripheral devices to provide different services. For example, the computing system may provide a network interface and a mass storage controller. While it is possible to construct the computing system with different peripheral devices (e.g., one that only supplies the network interface and one that only provides the mass storage controller), a multi-function peripheral device may provide a more convenient solution. For example, a multi-function peripheral device may allow a system administrator to acquire the devices from one vendor. Additionally, the system administrator need only learn the functionality and configuration requirements of one device. When building a computing system, the system administrator may only need to decide which service a specific device is to provide.

In many implementations, the functionality provided by a peripheral device may need to be known before the peripheral device is discovered by the computing system to which it is attached. This may, in many cases, be necessary because, during enumeration of the computing system, the peripheral device may have to tell the computing system what services it provides. Furthermore, the peripheral device itself may need to know what resources it needs so that it can request these resources from the computing system. When using a multi-function peripheral device, this may mean that the peripheral device and/or the computing system may need to be configured to select which of the multi-function peripheral device's functions the device will provide. In many cases, this selection may need to be made before the device is configured during the enumeration process.

Various methods may be used to select which of multiple services a multi-function peripheral device will provide. For example, the multi-function peripheral device may be provided with mechanical controls to control the service selection. Alternatively or additionally, the peripheral device may include a flash memory, and the peripheral device's configuration may be written into the flash memory prior to the device's installation in the system. As another example, the computing system may provide different slots for different functionality. For example, one computing system may provide a slot A for a network interface, which will provide access only to the network interface service of the multi-function peripheral device. Another computing system may also provide a slot A, in this case for a mass storage controller, which will provide access only to the mass storage controller service of the multi-function peripheral device. Alternatively or additionally, the computing system may include software that determines which service or services provided by a multi-function peripheral device will be used. The software may inform one computing system to access only the network interface service while the software may inform another computing system to access only the mass storage controller service.

While any of these methods may result in a properly configured peripheral device, the methods may place limitations on the design of the computing system and/or on the administration of the system. For example, implementations that use the computing system's hardware and/or software to select a service may mean that the computing system may not be "symmetric;" that is, it may not be possible to provision the computing system with multiple, identical servers. Each server-system may require differently configured slots and/or software. As another example, when the peripheral device may include mechanical controls, the system administrator may need to keep track of which device is providing which services. For example, in one server, the device attached to slot A may be a network interface, while, in another server, the device attached to slot A may be a mass storage controller.

A location-aware, multi-function peripheral device that is capable of self-configuration, may provide a potentially more efficient and possibly less error-prone solution. By being aware of its location—that is, where the device is attached to the computing system—the multi-function peripheral device may be operable to adopt a different personality, based on its location. For example, when the multi-function peripheral device is attached to slot A of the computing system, the device may adopt a personality that includes a network interface service. Furthermore, the same device, when attached to slot B, may adopt a personality that includes a mass storage service. In either case, the device may further configure itself according to the selected personality. In some implementations, these operations may occur before or concurrent with the enumeration processes, so that the multi-function peripheral device is prepared to respond to configuration access requests that may occur during enumeration.

A location-aware, self-configuring peripheral device thus may avoid the need to manually and mechanically configure the device. Furthermore, a location-aware, self-configuring peripheral device may provide predictability, because the device, when attached to the same slot in different servers, can be expected to always provide the same functionality. Additionally, a location-aware, self-configuring may allow for the configuring of symmetric systems, where each server can be identically provisioned but have use of different peripheral devices because of the server's location in the system.

Figure 3:
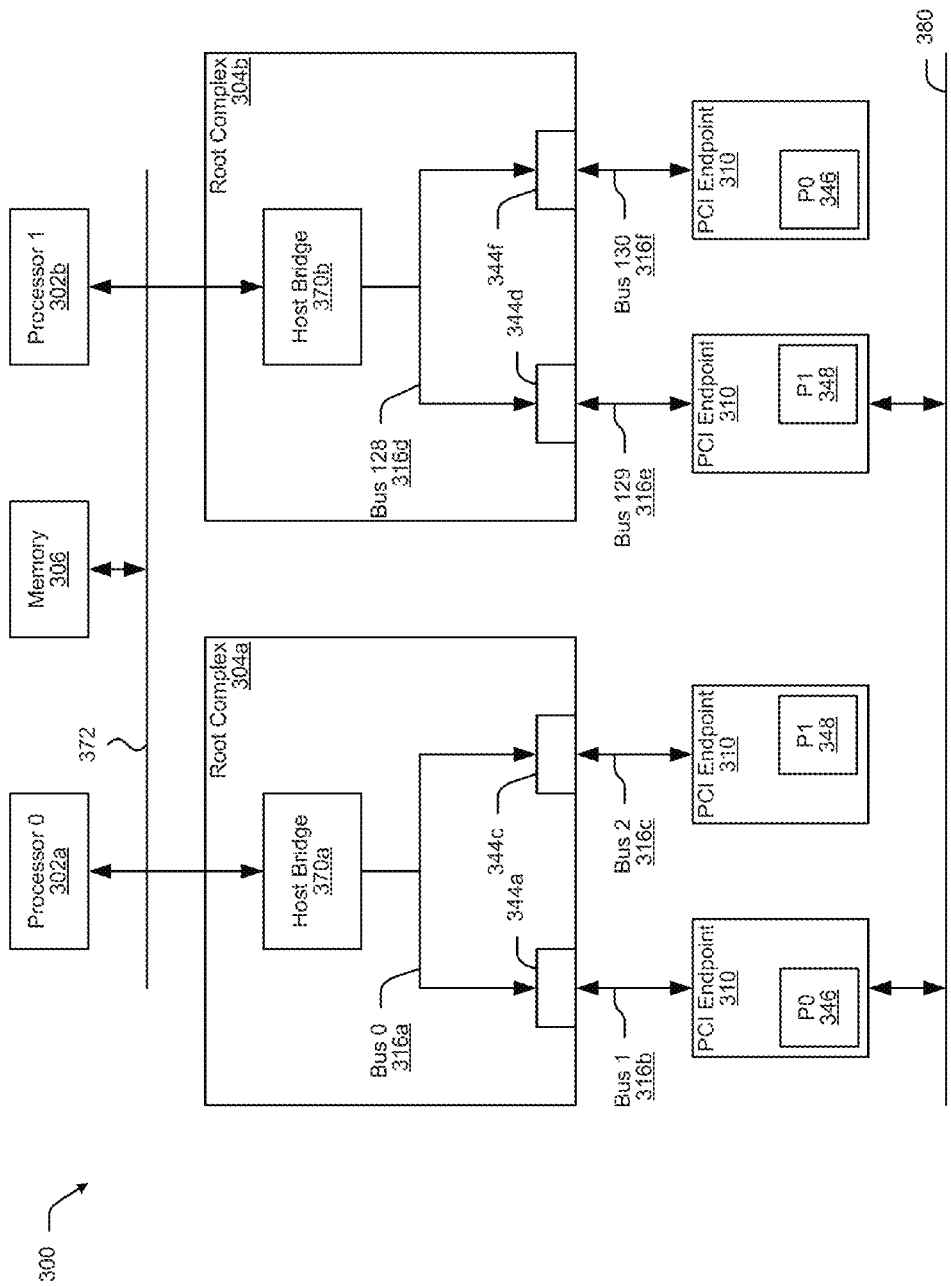
FIG. 3 illustrates an example of a computing system that includes location-aware peripheral devices that are capable of self-configuration.

FIG. 3 illustrates an example of a computing system 300 that includes location-aware peripheral devices that are capable of self-configuration. The example computing system 300 includes, by way of example, two processors. Processor 0 302*a* and Processor 1 302*b*. The processors 302*a-b* are configured to communicate with each other and a memory subsystem 306 over a processor bus 372. The memory subsystem 306 provides temporary and/or long-term storage for data that may be operated on by the processors 302*a-b*.

Each of the processors 302*a-b* may further communicate with dedicated root complexes 304*a-b*. The root complexes 304*a-b* may provide, to each of the processors 302*a-b*, access to a set of peripheral devices. In this example, Processor 0 302*a* may communicate with a root complex 304*a* and through the root complex 304*a* access one set of peripheral devices. Similarly, Processor 1 302*b* may communicate with a root complex 304*b* and through the root complex 304*b* access a different set of peripheral devices. For purposes of this example, the peripheral devices accessible to each processor 302*a-b* are not shared. Also for purposes of this example, the peripheral devices are PCI endpoints. PCI endpoints are used here only for illustrative purposes and as representative of peripheral devices in general, including peripheral devices that may implement other bus protocols such as ISA, EISA, VESA, SCSI, SATA, PATA, and the like.

Each of the root complexes 304*a-b* in this example include a host bridge 370*a-b*, an internal communication channel 316*a*, 316*d*, and several ports 344*a*, 344*c*, 344*d*, 344*f*. The host bridge 370*a-b* may provide translation from the communication or bus protocol used on the processor bus 372 to the communication protocol used by the peripheral devices, which in this example is PCI. The internal communication channel 316a, 316d may provide communication between the host bridge 370a-b and the ports 344a, 344c, 344d, 344f. The ports 344a, 344c, 344d, 344f may provide a connection to one or more PCI endpoints over external communication channels 316b-c, 316e-f. As discussed above, other PCI devices may be connected to the ports 344a, 344c, 344d, 344f, including switches and bridges.

The PCI endpoints 310 attached to the root complexes 304a-b in this example are each location-aware, self-configuring PCI endpoints 310. For purposes of this example, the PCI endpoints 310 are multiple instances of the same PCI endpoint 310. In other examples, the PCI endpoints 310 may be different location-aware, self-configuring PCI endpoints capable of providing different services than are provided by the example PCI endpoint 310 described here. In yet other examples, the computing system 300 may include a combination of location-aware, self-configuring PCI endpoints and non-location-aware PCI endpoints. The operation of the location-aware, self-configuring PCI endpoints 310 is discussed in further detail below.

The communication channels that connect the devices in the computing system 300—including the communications channels 316d internal to the root complexes 304a-b and the communication channels 316b-c, 316e-f connecting the root complexes 304a-b to the PCI endpoints 310—may be numbered. Numbering the communication channels may provide at least one way for the computing system 300 to identify parts of the system and/or devices in the system. Thus, for example, the communication channels 316a, 316d internal to the root complexes 304a-b may be labeled Bus 0 316a for the root complex 304a and Bus 128 for the root complex 316d. Furthermore, the communication channels 316b-c between the root complex 304a and the PCI endpoints 310 may be labeled Bus 1 316b and Bus 2 316c. Additionally, the communication channels 316e-f between the root complex 304b and the PCI endpoints 310 may be labeled Bus 129 316e and Bus 310 316f.

The components in the computing system 300 may use the bus numbers for self-identification. For example, the bus number may be part of a requester identifier. A requester identifier identifies the device or component that requested or initiated a transaction. PCI devices, such as endpoints, switches, and bridges, typically use the bus number in their immediate upstream direction, while processors typically use the bus number internal to their attached root complex. Endpoints, in most cases, learn their bus number when the bus number is assigned during enumeration.

In some implementations, the requester identifier may also include a device number and/or a function number. The device number identifies a device on the bus to which it is attached. In legacy PCI implementations, more than one endpoint could share a PCI bus; hence, an endpoint could have a device number greater than zero. In PCIe implementations, endpoints usually have zero as their device number. In various implementations, a processor can use the device number in various ways, such as for example to identify a processor in a cluster of processors, and/or a port on a processor. A function number identifies a function that is the initiator of the request. For processors, the function number is usually zero. In the illustrated example, Processor 0 302a may use the requester identifier "0-0-0," which stands for Bus 0 316a, device zero, and function zero. Similarly, Processor 0 302a may use the requester identifier "128-0-0," which stands for Bus 128 316b, device zero, and function zero.

Requester identifiers can also be used as completer identifiers. Completer identifiers may be used to identify the device that responded to or "completed" a transaction. A transaction, in some cases, may thus have a requester identifier, identifying the initiator of the request and a completer identifier, identifying the responding device.

As noted above, in this example, the illustrated PCI endpoints 310 are location-aware and self-configuring. The PCI endpoints 310 in this example each include two personalities, P0 346 and P1 348. P0 346 may provide, for example, a network interface service, while P1 348 may provide a mass storage controller service. As another example, in some implementations, one of the personalities 346, 348 may provide the services of a switch while the other provides the services of a bridge. In another example, in some implementations, the personalities 346, 348 may provide the same services, but the service provided by P0 346 may have different capabilities as the service provided by P1 348. In a further example, in some implementations, P0 346 may provide just one service, while P1 348 may provide multiple services.

As noted above, each of the four illustrated PCI endpoints 310 may be the same PCI endpoint 310 attached at different locations in the computing system 300, or may be duplicate instances of the one PCI endpoint 310.

In some implementations, the PCI endpoint 310 may determine its location by examining configuration cycles received from either processor 302a-b. As noted above, each processor 302a-b may be in communication with its own root complex 304a-b, and through the root complexes 304a-b to separate groups of PCI endpoints 310. Each processor 302a-b, with its associated root complex 304a-b and PCI endpoints 310, may be described as a separate sub-system. Each processor 302a-b may enumerate its own sub-system. During enumeration, each of the PCI endpoints 310 in the sub-system may receive configuration cycles from the processor 302a-b in the PCI endpoint's 310 sub-system. The configuration cycles may take the form of configuration read transactions and/or configuration write transactions.

In some implementations, enumeration may take place immediately after a link initialization and training stage. Link initialization and training may be a process to configure and initialize ports and links (e.g., busses) that connect various devices in the computing system 300. Link initialization and training enables the ports and links to pass normal traffic between the devices. In these implementations, the start of enumeration may provide the earliest opportunity for the PCI endpoint 310 to determine its location. In some implementations, however, the PCI endpoint 310 may be able to determine its location after enumeration has started.

Configuration cycles received by the PCI endpoint 310 during enumeration may include information that the PCI endpoint 310 can use to determine its location. For example, a configuration read or write transaction may include a requester identifier. The requester identifier may identify the processor 302a-b that is transmitting the configuration cycles. For example, the PCI endpoint 310 connected to Bus 1 316b may examine the requester identifier and may determine (for example, by looking for a bus number) that Processor 0 302a transmitted the configuration cycles. In some implementations, the PCI endpoint 310 may examine only the first configuration cycle, or group of configuration cycles, it receives, and extract location information from this cycle or cycles. In other implementations, the PCI endpoint 310 may examine configuration cycles continuously, and should the location information provided by the configuration cycles change, the PCI endpoint 310 may select a different personality and re-configure itself. In yet other implementations, the PCI endpoint 310 may examine configuration cycles periodically.

In some implementations, a PCI endpoint 310 may not receive configuration cycles, or may not be able to determine its location from the configuration cycles it receives. In these implementations, the PCI endpoint 310 may select a default personality during enumeration or thereafter. In other implementations, the PCI endpoint 310 may configure itself with a default personality when it powers up and before receiving any configuration cycles. In either of these implementations, the PCI endpoint 310 may be operable regardless of whether it is able to determine its location.

Having determined that it is located in the subsystem that includes Processor 0 302*a*, the PCI endpoint 310 connected to Bus 1 316*b* may next select which one of its personalities 346, 348 this PCI endpoint 310 instance will adopt. For example, because it is located in the subsystem that includes Processor 0 302*a*, the PCI endpoint 310 connected to Bus 1 316*b* may select P0 346. P0 346 may, for example, provide a network interface service, such that the PCI endpoint 310 connected to Bus 1 316*b* would provide a network interface for the computing system 300.

A further example is provided by the PCI endpoint 310 connected to Bus 129 316*e*. This PCI endpoint 310 may receive configuration cycles during enumeration also. The PCI endpoint 310 connected to Bus 129 316*e* may examine these configuration cycles to determine its location. For example, this PCI endpoint 310 may examine a requester identifier included with the configuration cycles, and determine (for example, by looking for a bus number) that it is located in the subsystem that includes Processor 1 302*b*. The PCI endpoint 310 attached to Bus 129 316*e* may therefore select P1 348 as the personality that this PCI endpoint 310 instance will adopt. P1 348 may, for example, provide a mass storage controller service, such that the PCI endpoint 310 connected to Bus 129 316*e* would provide a mass storage controller for the computing system 300.

Upon selecting a personality, in some implementations, the PCI endpoint 310 may configure itself according to the selected personality 346, 348. This self-configuration may involve initializing configuration registers with information that is specific to the selected services provided by each personality. Examples of service-specific information include a function identifier, memory and/or address space needs, and device capabilities, among others. Self-configuration may also include initializing configuration register with general or non-service-specific information. Typically, self-configuration occurs before the enumeration process may attempt to access the configuration information. In some implementations, all self-configuration takes place after the first configuration cycle that provides location information and before full enumeration may take place. In other implementations, self-configuration may take place at any time during or throughout the enumeration process. In some implementations, an optional configuration management module may manage the self-configuration, including providing configuration data specific to the selected personality.

In some implementations, the PCI endpoint 310 may look for information other than a requester identifier to determine its location. For example, the PCI endpoint 310 connected to Bus 2 316*c* may receive a configuration write transaction that informs the PCI endpoint 310 of its attached bus number. The bus number may indicate to this PCI endpoint 310 where it is located. The PCI endpoint 310 connected to Bus 2 316*c* may be configured, for example, to look for an even-number bus number, a bus number above a certain value, the bus numbered "2," or some other bus number qualifier. Having determined that it is attached to Bus 2 316*c*, this PCI endpoint 310 may select P1 348 as the personality that this PCI endpoint 310 instance will adopt. The PCI endpoint 310 connected to Bus 2 316*c* may further configure itself according to the selected personality, including determining its resource needs and/or setting configuration registers with service-specific information.

The PCI endpoint 310 connected to Bus 130 316*f* may be configured similarly. Specifically, this PCI endpoint 310 may determine its location by looking for its bus number assignment. This PCI endpoint 310 may be configured to look for, for example, a bus number that is a multiple of five or ten, a bus number above a certain value, the bus numbered "130" or some other bus number qualifier. Having determined that it is attached to Bus 130 316*f*, this PCI endpoint 310 may select P1 346 as its personality. The PCI endpoint 310 that is connected to Bus 130 316*f* may further configure itself according to the selected personality.

In some implementations, the PCI endpoint's 310 location can also be used to configure other identification information for the PCI endpoint 310. For example, the example computing system 300 may include a secondary bus 380. This secondary bus 380 may be, for example, an Inter-Integrated Circuit (I²C) bus. In this example, the PCI endpoint 310 connected to Bus 1 316*b* and the PCI endpoint 310 connected to bus 129 316*e* may be connected to the secondary bus 380. The protocol implemented on the secondary bus 380 may require that each device attached to the secondary bus 380 be uniquely identified. For example, each of the PCI endpoints 310 may need to use a unique address to identify themselves on the secondary bus 380. In some implementations, device identifiers may be hardwired, and thus fixed, in the device. In other implementations, software may configure the identifiers. The PCI endpoints 310 illustrated here may use their location to select their unique identifiers. For example, the PCI endpoint 310 connected to Bus 1 316*b* may select the hexadecimal address 0x00001000 as its identifier, while the PCI endpoint 310 connected to Bus 129 316*e* may select the hexadecimal address 0x00002000 as its identifier.

The example provided by FIG. 3 can also be applied to more complex computing systems. For example, a computing system may include four processors, e.g., Processor 0, Processor 1, Processor 2, and Processor 3. As in the example illustrated by FIG. 3, each of these processors may be assigned a bus number that the processor can use as part of its requester identifier. For example, Processor 0 may be assigned bus 0, Processor 1 may be assigned bus 64, Processor 2 may be assigned bus 128, and Processor 3 may be assigned bus 129. Each processor may further be in communication with individual sub-systems that include one or more location-aware and self-configuring peripheral devices. Each of the four processors may enumerate and configure their own sub-systems. During enumeration, each location-aware and self-configuring peripheral device may receive configuration cycles that identify the processor that is enumerating the sub-system. The location-aware, self-configuring peripheral devices may examine the configuration cycles to determine their location in the computing system. For example, the peripheral devices may examine a requester identifier sent with the configuration cycles, and identify the bus number of the requesting processor. The peripheral devices may use the bus number to identify their location in the computing system. Having done so, the peripheral devices may select one from among several personalities, where the selected personality will provide one or more services for the specific peripheral device instance. Each peripheral device may further configure itself according to the selected personality.

Figure 4:
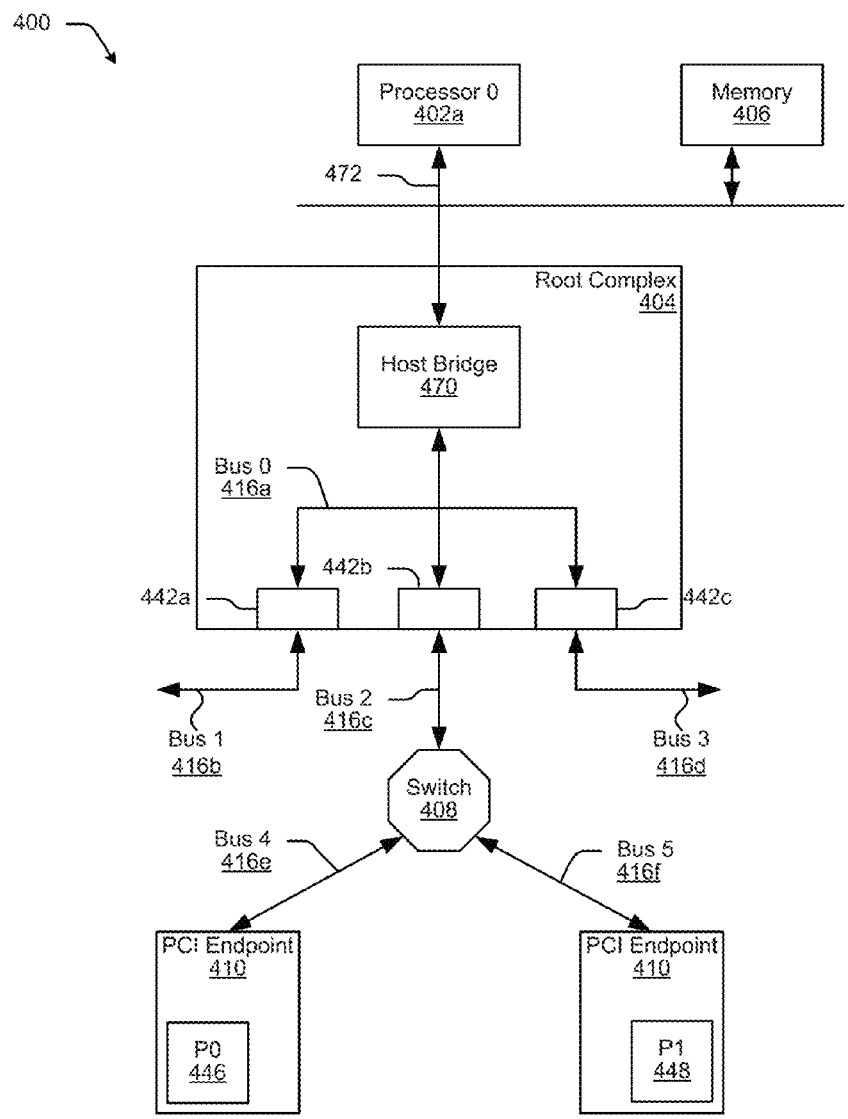
FIG. 4 illustrates another example of a computing system that includes location-aware, self-configuring peripheral devices.

FIG. 4 illustrates another example of a computing system 400 that includes location-aware, self-configuring peripheral devices. In this example, the computing system 400 includes a processor, Processor 0 402*a*, connected to a processor bus 472. Processor 0 402*a* may communicate with a memory subsystem 406 over the processor bus 472. The memory subsystem may provide temporary and/or long-term storage for data that may be operated on by Processor 0 402*a*. In some implementations, the computing system 400 may include additional processors connected to the processor bus 472.

Processor 0 402*a* may also communicate with a root complex 404. The root complex may provide Processor 0 402*a* with access to a set of peripheral devices. For purposes of this example, the peripheral devices are PCI endpoints 410. PCI endpoints are used here only for illustrative purposes and as representative of peripheral devices in general. The root complex 404 may include a host bridge 470, an internal communication channel 416*a*, and several ports 442*a-c*. The host bridge 470 may provide translation from the bus protocol used on the processor bus 472 to the communication protocol used by the peripheral devices, which in this example is PCI. The internal communication channel 416*a* may provide communication between the host bridge 470 and the ports 442*a-c*. The ports 442*a-c* may provide connections to one or more PCI devices, such as endpoints, switches, and/or bridges, over external communication channels 416*b-d*.

In this example, a switch 408 is connected to a port 442*b* on the root complex 404. The switch 408 may provide multiple additional ports that can be used to connect peripheral devices to the computing system 400. For example, in this example, two PCI endpoints 410 are connected to the switch 408, each having its own communication channel 416*e-f* with the switch 408. The switch 408 may also route transactions between the root complex and each of the PCI endpoints 410.

The communication channels that connect the devices in the computing system 400—including the root complex's 404 internal communication channel 416*a*, the communication channels 416*b-d* connected to the root complex's 404 ports 442*a-c*, and the communication channels 416*e-f* connecting the PCI endpoints 410 to the switch 408—may be numbered. Numbering the communication channels may provide at least one way for the computing system 400 to identify parts of the system and/or devices in the system. In this example, the root complex's 404 internal communication channel is labeled Bus 0 416*a*, while the three communication channels connected to the root complex's 404 ports are labeled Bus 1 416*b*, Bus 2 416*c*, and Bus 3 416*d*. The communication channel connecting one PCI endpoint 410 to the switch 408 is labeled Bus 4 416*e*, while the communication channel connecting the other PCI endpoint 410 to the switch 408 is labeled Bus 5 416*f*.

The PCI endpoints 410 in this example may be location-aware and self-configuring. For purposes of this example, the PCI endpoints 410 are duplicates, or multiple instances of the same device. In other examples, the PCI endpoints 410 may be different location-aware, self-configuring peripheral devices, each providing different services. In yet other examples, the PCI endpoints 410 may be a combination of location-aware and non-location-aware devices.

The PCI endpoints 410 in this example include two personalities, P0 446 and P1 448. P0 446 may be, for example, provide a network interface service, while P1 448 may provide a mass storage controller service. As another example, P0 446 may provide the services of a switch, while P1 448 provides the services of a bridge. In another example, P0 446 may provide the same service as P1 448, but the service provided by P0 446 may have different capabilities than the service provided by P1 448. As yet another example, P0 446 may provide just one service, while P1 448 may provide multiple services.

In some implementations, the PCI endpoints 410 may determine their location by examining configuration cycles received from Processor 0 402*a*. Processor 0 402*a* may transmit configuration cycles while enumerating the computing system 400. The PCI endpoints 410 may examine the configuration cycles to determine their location in the computing system 400. For example, the PCI endpoints 410 may examine a requester identifier that may be included in the configuration cycles. The requester identifier may identify Processor 0 402*a*, for example by including Processor 0's 402 assigned bus number. Processor 0's 402 assigned bus number (e.g., Bus 0 416*a*) may indicate to the PCI endpoints 410 that they are located in a particular sub-system within the computing system 400. Using this determined location, the PCI endpoints 410 may select a personality that each PCI endpoint 410 instance will adopt. For example, the PCI endpoint 410 connected to Bus 4 416*e* may select P0 446, and thus, for example, provide a network interface service for the computing system 400.

The PCI endpoints 410 may also examine configuration cycles for other information that informs a PCI endpoint 410 of its location. For example, the PCI endpoint 410 connected to Bus 5 416*f* may look for its assigned bus number (e.g., Bus 5 416*f*). The PCI endpoint's 410 assigned bus number may be provided in a configuration write transaction directed to the PCI endpoint 410. The PCI endpoint 410 connected to Bus 5 416*f* may look for, for example, an odd-numbered bus number, a bus number that is a multiple of five, a bus number that is above a certain number, the bus number "5," or some other bus number qualifier. The PCI endpoint 410 may, having determined that it is connected to Bus 5 416*f*, select P1 a the personality that this PCI endpoint 410 instance will adopt. The PCI endpoint 410 may thus, for example, provide a mass storage controller service for the computing system 400.

Having selected a personality 446, 448, each PCI endpoint 410 may also configure itself. This self-configuration may include initializing configuration registers with information that is specific to the selected personality, such as a function identifier, memory and/or address space needs, and device capabilities, among others. Self-configuration may also include initializing configuration registers with general or non-service-specific information.

As illustrated by the examples provided in FIGS. 3 and 4, a location-aware, self-configuring peripheral device may provide a device that is able to automatically select its personality—and thereby select the services to provide to a computing system—based on the device's location. Selecting a personality may include selecting from among multiple personalities included by the peripheral device, and self-configuration based on the selected personality. A location-aware, self-configuring peripheral device thus may not need to be manually and/or mechanically configured prior to being attached to the computing system. A location-aware, self-configuring peripheral device may also provide consistency and predictability, because the device, when attached to the same slot in different servers, can be expected to always provide the same services. Additionally, a location-aware, self-configuring peripheral device may allow for the configuring of symmetric systems, where each server can be identically provisioned but have use of different peripheral devices because of the server's location in the system.

II. Methods

Figure 5:
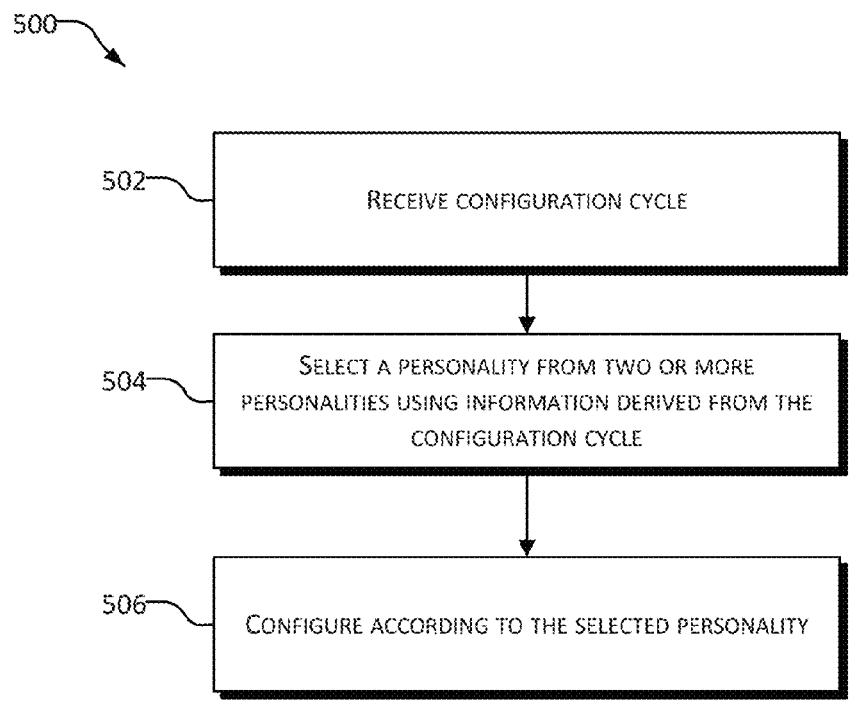
FIG. 5 provides on example of a process for providing location awareness and self-configuration.
Figure 6:
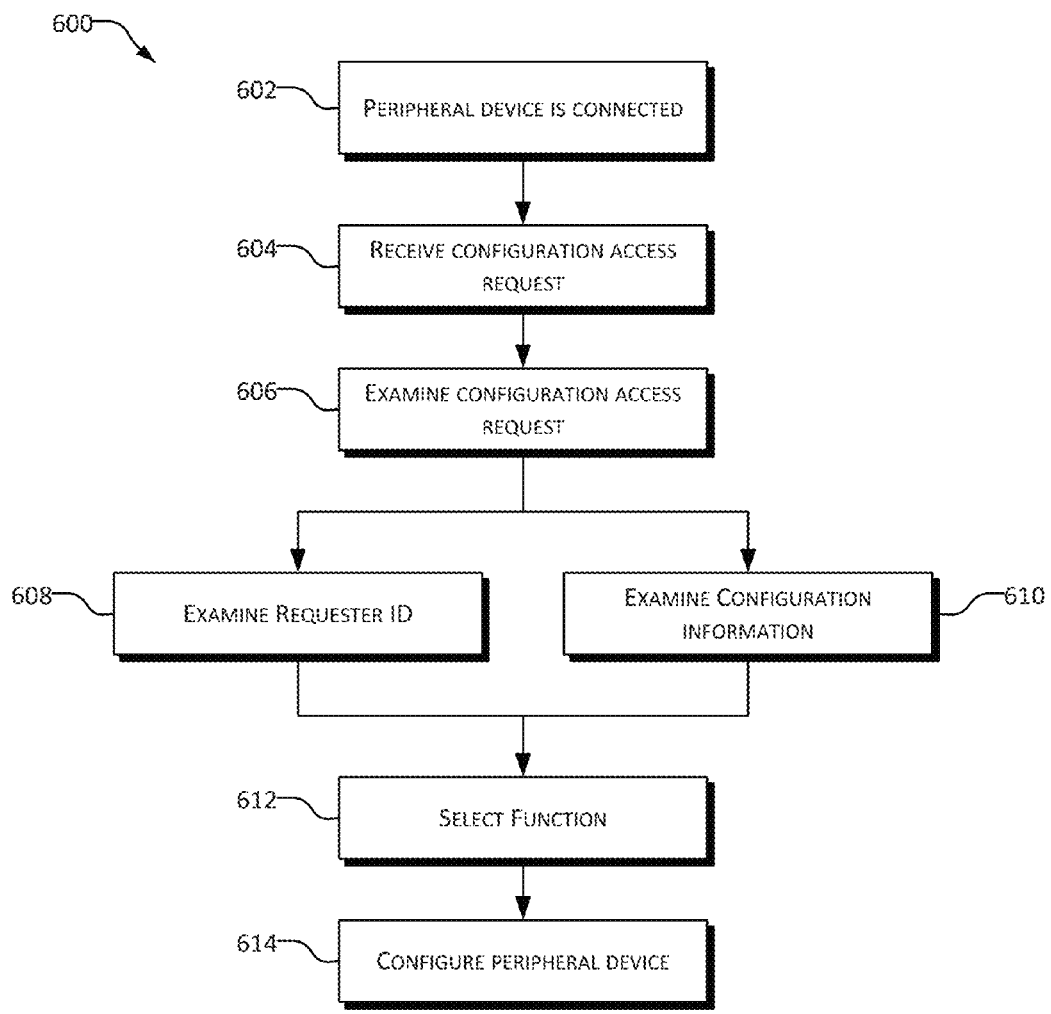
FIG. 6 illustrates in greater detail an example of a process for providing location awareness and self-configuration.

FIGS. 5-6 provide examples of processes for providing a location-aware, self-configuring peripheral device. Some or all of the processes (or any other processes described herein, or variations, and/or combinations thereof) may be performed under the control of one or more computing systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 5 provides one example of a process 500 for providing location awareness and self-configuration. The illustrated process 500 may be executed by any of the peripheral devices described with respect to FIGS. 2-4.

In FIG. 5, at step 502, the peripheral device may receive a configuration cycle. Configuration cycles may be received during enumeration of the computing system. The configuration cycles may include configuration read transactions and/or configuration write transactions. The configuration cycles may have been initiated by a processor that is executing the enumeration process. The configuration cycles may include information that indicates to the peripheral device where in the computing system the peripheral device is located. For example, the configuration cycles may include a requester identifier, which identifies the device that initiated the configuration cycles. In many implementations, the requester is a processor. The requester identifier may include a bus number assigned to the processor. By examining the bus number, the peripheral device may determine that it is located in a sub-system that includes the processor. The bus number included in the requester identifier may provide one way for the peripheral device to identify its location. The peripheral device may use other information that may be included in configuration cycles, such as a bus number that is assigned to the peripheral device.

In some implementations, the PCI endpoint may examine only the first configuration cycle, or group of configuration cycles, it receives, and extract location information from this cycle or cycles. In other implementations, the PCI endpoint may examine configuration cycles continuously, and should the location information provided by the configuration cycles change, the PCI endpoint may select a different personality and re-configure itself. In yet other implementations, the PCI endpoint may examine configuration cycles periodically.

In some implementations, the PCI endpoint may have a default personality. The default personality may provide services and configurations that the PCI endpoint can apply at power up, and before enumeration begins. Alternatively, the PCI endpoint may apply the default personality during enumeration or thereafter. In these implementations, the PCI endpoint may be configured and operable regardless of whether it is able to determine its location.

At step 504, the peripheral device may select a personality from two or more personalities using information derived from the configuration cycle. The peripheral device may include two or more personalities. A personality includes hardware and/or software that implement one or more services that the peripheral device is able to provide. For example, one personality may include a network interface service while another personality may include a mass storage controller service. The peripheral device may select from among its personalities using the location information derived from the configuration cycle received at step 502.

At step 506, the peripheral device may configure itself according to the selected personality. Self-configuration may include setting values in configuration registers that are specific to the selected personality, such as a function number, memory and/or address space requirements, and device capabilities, among others. Self-configuration may also include setting general non-service-specific configuration values. In some implementations, step 502 concludes at the start of the enumeration processes. In other implementations, step 506 may take place concurrent with the enumeration process. In most cases, configuration registers are prepared before they may be accessed by the enumeration process.

FIG. 6 illustrates in greater detail an example of a process 600 for providing location awareness and self-configuration. The illustrated process 600 may be executed by any of the peripheral devices described with respect to FIGS. 2-4.

In FIG. 6, at step 602, the peripheral device may be connected to a computing system. The peripheral device may be, for example, plugged into a slot, connected to a cable, and/or attached to a port. The peripheral device may subsequently receive power, and begin operating, including executing the remaining steps of the illustrated process 600.

At step 604, the peripheral device may receive a configuration access request. The configuration access request may be received during enumeration of the computing system. The configuration access request may by a configuration read transaction and/or a configuration write transaction. The configuration access request may have been initiated by a processor that is executing the enumeration process.

The configuration access request may include information that indicates the location of the peripheral device in the computing system. At step 606, the peripheral device may examine the configuration access request to determine its location. The peripheral device may look for several different pieces of information that may provide the peripheral device's location. Two examples are illustrated. At step 608, the peripheral device may examine the requester identifier that may have been supplied with the configuration access request. The requester identifier may identify the initiator of the configuration access request. In many cases, the requester may be a processor. The processor may be identified by a bus number. By examining the bus number, the peripheral device may be able to determine that it is located in the sub-system that includes the processor. In this way, the peripheral device may learn its location.

The other example method for the peripheral device to determine its location is illustrated at step 610. At step 610, the peripheral device may examine configuration information provided with the configuration access request. This configuration information may include information meant to configure the peripheral device. For example, the configuration information may be a bus number that is to be assigned to the peripheral device. The assigned bus number may indicate to the peripheral device where it is located in the computing system.

Having determined its location in the computing system, the peripheral device may, at step 612, select a personality from two or more personalities. The selected personality may include one or more services, and selecting a personality may enable the peripheral device to provide those services. That is, the peripheral device may provide, for example, a network interface service or a mass storage controller service to the computing system.

At step 614, the peripheral device may configure itself according to the selected personality. Self-configuration may include setting values in configuration registers that are specific to the selected personality, such as a function number, memory and/or address space requirements, and device capabilities, among others. Self-configuration may also include setting general non-service-specific configuration values. In some implementations, step 614 concludes at the start of the enumeration processes. In other implementations, step 614 may take place concurrent with the enumeration process. In most cases, configuration registers are prepared before they may be accessed by the enumeration process.

III. Computing Systems

Figure 7:
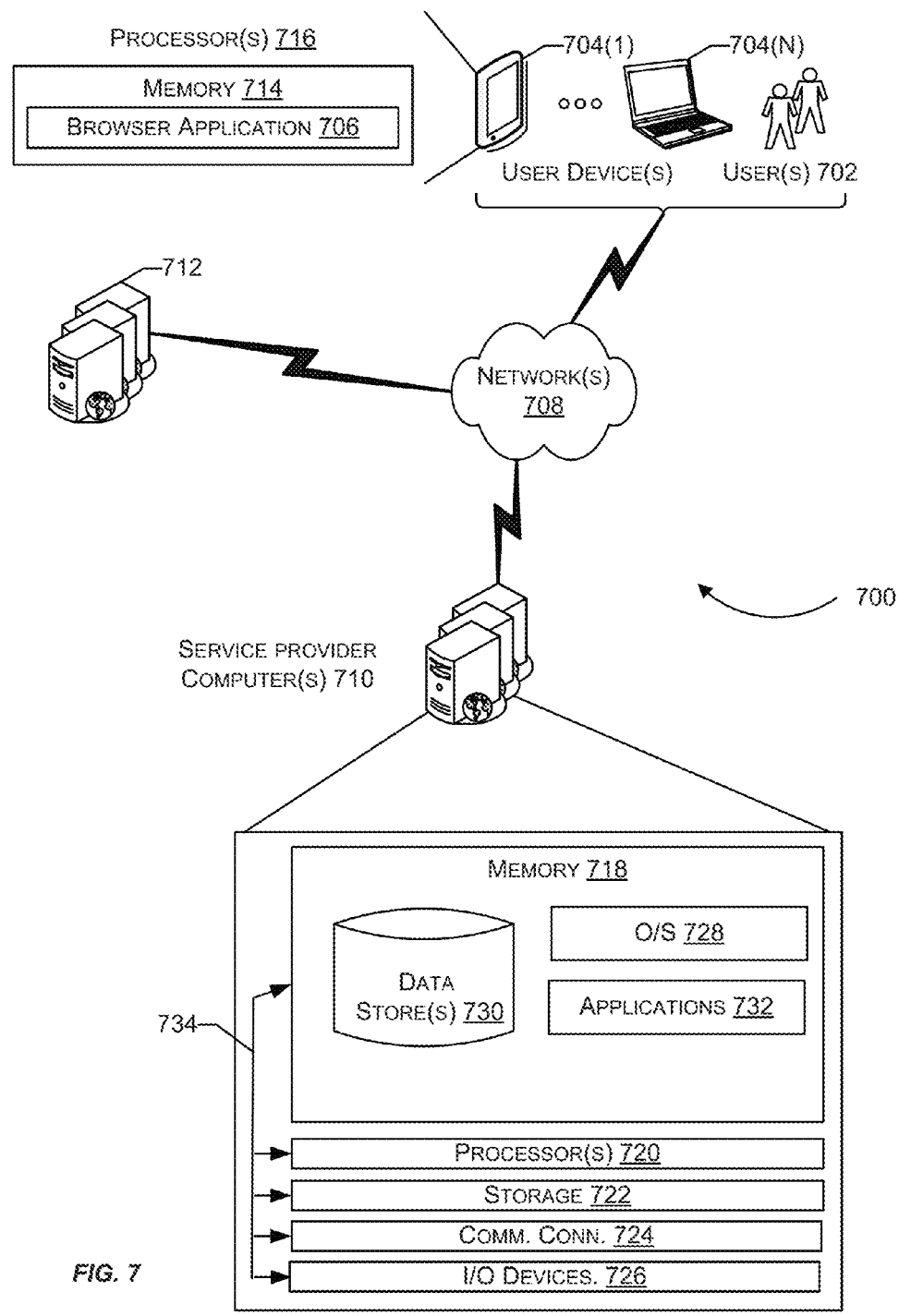
FIG. 7 illustrates an example architecture for features and systems described herein that includes one or more service provider computers and/or a user device connected via one or more networks, according to some embodiments.

FIG. 7 illustrates an example architecture for features and systems described herein that includes one or more service provider computers and/or a user device connected via one or more networks. The devices discussed in FIGS. 2-6 may use one or more components of the computing devices described in FIG. 7 or may represent one or more computing devices described in FIG. 7. In the illustrated architecture 700, one or more users 702 may use user computing devices 704(1)-(N) to access an application 706 (e.g., a web browser or mobile device application), via one or more networks 708. In some aspects, the application 706 may be hosted, managed, and/or provided by a computing resources service or service provider. One or more service provider computers 710 may provide a native application that is configured to run on the user devices 704, which user(s) 702 may interact with. The service provider computer(s) 710 may, in some examples, provide computing resources such as, but not limited to, client entities, low latency data storage, durable data storage, data access, management, virtualization, cloud-based software solutions, electronic content performance management, and so on. The service provider computer(s) 710 may also be operable to provide web hosting, computer application development and/or implementation platforms, combinations of the foregoing or the like to the user(s) 702. The service provider computer(s) 710, in some examples, may communicate with one or more third party computers 712.

In some examples, network(s) 708 may include any one or a combination of many different types of networks, such as cable networks, the Internet, wireless networks, cellular networks and other private and/or public networks. While the illustrated example represents the user(s) 702 accessing an application 706 over the network(s) 708, the described techniques may equally apply in instances where the user(s) 702 interact with the service provider computer(s) 710 via user device(s) 704 over a landline phone, via a kiosk or in some other manner. The described techniques may also apply in other client/server arrangements (e.g., set-top boxes, etc.), as well as in non-client/server arrangements (e.g., locally stored applications, etc.).

As described briefly above, the application 706 may allow the user(s) 702 to interact with the service provider computer(s) 710 to, for example, access web content (e.g., web pages, music, video, etc.). The service provider computer(s) 710, which may be arranged in a cluster of servers or as a server farm, may host the application 706 and/or cloud-based software services. Other server architectures may also be used to host the application 706. The application 706 may be capable of handling requests from many users 702 and serving, in response, various item web pages. The application 706 can provide any type of website that supports user interaction, including social networking sites, online retailers, informational sites, blog sites, search engine sites, news and entertainment sites, and so forth. As discussed above, the described techniques can similarly be implemented outside of the application 706, such as with other applications running on the user device(s) 704.

The user device(s) 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 704 may be in communication with the service provider computer(s) 710 via the network(s) 708, or via other network connections. Additionally, the user device(s) 704 may be part of the distributed system managed by, controlled by, or otherwise part of the service provider computer(s) 710 (e.g., a console device integrated with the service provider computers 710).

In one illustrative configuration, a user device(s) 704 may include at least one memory 714 and one or more processing units (or processor(s) 716). The processor(s) 716 may be implemented in hardware, computer-executable instructions, firmware, or combinations thereof. Computer-executable instruction or firmware implementations of the processor(s) 716 may include computer-executable or machine-executable instructions written in any suitable programming language to perform the various functions described. The user device(s) 704 may also include geo-location devices (e.g., a global positioning system (GPS) device or the like) for providing and/or recording geographic location information associated with the user device(s) 704.

The memory 714 may store program instructions that are loadable and executable on the processor(s) 716, as well as data generated during the execution of these programs. Depending on the configuration and type of the user device(s) 704, the memory 714 may be volatile (such as random access memory (RAM)) and/or non-volatile (such as read-only memory (ROM), flash memory, etc.). The user device(s) 704 may also include additional removable storage and/or non-removable storage including, but not limited to, magnetic storage, optical disks and/or tape storage. The disk drives and their associated computer-readable media may provide non-volatile storage of computer-readable instructions, data structures, program modules, and other data for the computing devices. In some implementations, the memory 714 may include multiple different types of memory, such as static random access memory (SRAM), dynamic random access memory (DRAM), or ROM.

Turning to the contents of the memory 714 in more detail, the memory 714 may include an operating system and one or more application programs or services for implementing the features disclosed herein including at least a user provided input element or electronic service web page, such as via a browser application 706 or dedicated applications (e.g., smart phone applications, tablet applications, etc.). The browser application 706 may be configured to receive, store and/or display a website or other interface for interacting with the service provider computer(s) 710. Additionally, the memory 714 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user-provided response to a security question or a geographic location obtained by the user device 704.

In some aspects, the service provider computer(s) 710 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 710 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 710 may be in communication with the user device(s) 704 and/or other service providers via the network(s) 708, or via other network connections. The service provider computer(s) 710 may include one or more servers, perhaps arranged in a cluster, as a server farm, or as individual servers not associated with one another. These servers may be configured as part of an integrated, distributed computing environment.

In one illustrative configuration, the service provider computer(s) 710 may include at least one memory 718 and one or more processing units (or processor(s) 720). The processor(s) 720 may be implemented in hardware, computer-executable instructions, firmware, or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as buses and second or third level of caches. In some instances, each core in a single or multi-core processor may also include multiple executing logical processors (or threads). In such a core (e.g., those with multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the service provider computer(s) 710, the memory 718 may be volatile (such as RAM) and/or non-volatile (such as ROM, flash memory, etc.). The service provider computer(s) 710 or servers may also include additional storage 722, which may include removable storage and/or non-removable storage. The additional storage 722 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 718 may include multiple different types of memory, such as SRAM, DRAM, or ROM.

The memory 718, the additional storage 722, both removable and non-removable are all examples of computer-readable storage media. For example, computer-readable storage media may include volatile or non-volatile, removable or non-removable media implemented in any method or technology for storage of information such as computer-readable instructions, data structures, program modules, or other data. The memory 718 and the additional storage 722 are all examples of computer storage media. Additional types of computer storage media that may be present in the service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 710. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 710 may also contain communications connection(s) 724 that allow the service provider computer(s) 710 to communicate with a stored database, another computing device or server, user terminals and/or other devices on the network(s) 708. The service provider computer(s) 710 may also include I/O device(s) 726, such as a keyboard, a mouse, a pen, a voice input device, a touch input device, a display, speakers, a printer, and the like. The communication connection(s) 724 and I/O device(s) 726, along with the storage 722, may be described as peripheral devices.

The memory 718 may include an operating system 728, one or more data stores 730 and/or one or more application programs 732 or services for implementing the features disclosed herein.

The service provider computer(s) 710 may also include one or more communication channels 734. A communication channel 734 may provide a medium over which the various components of the service provider computer 710 can communicate. The communication channel or channels 734 may take the form of a bus, a ring, a switching fabric, or a network.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

Figure 8:
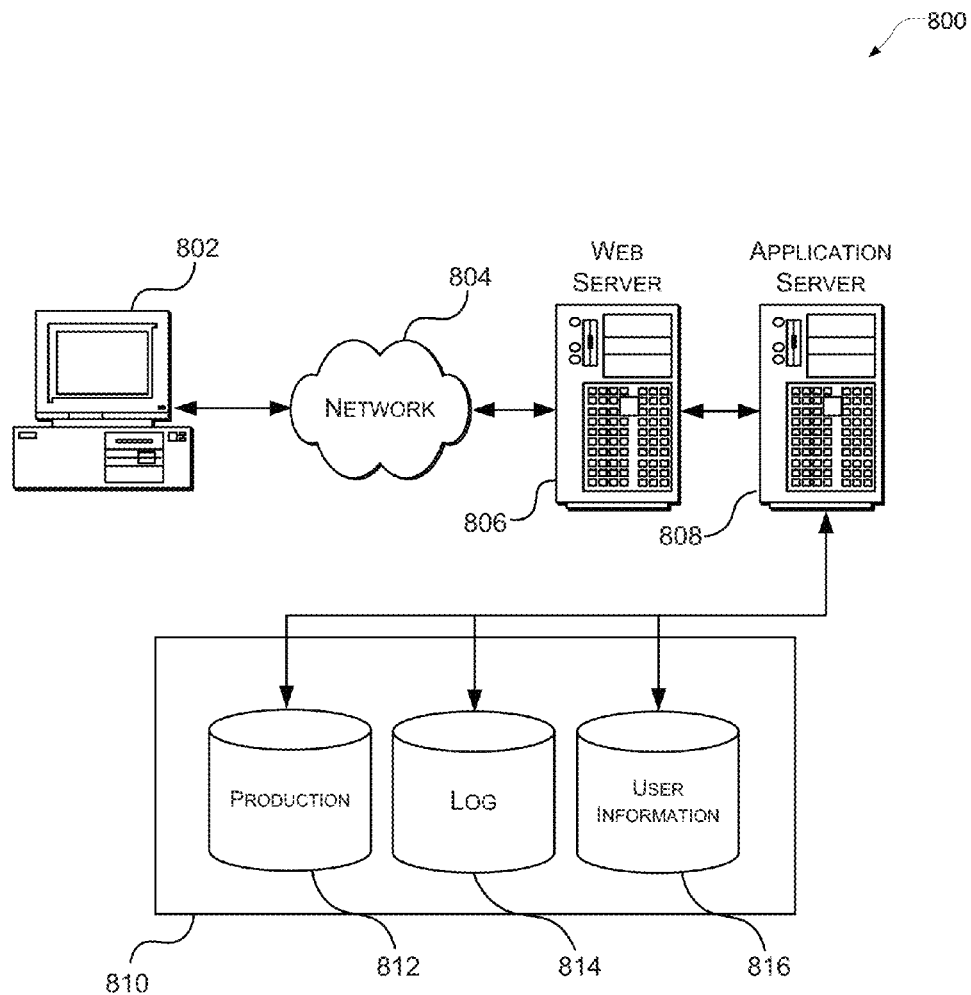
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A Peripheral Component Interconnect (PCI) device comprising:
  a bus interface module, wherein the bus interface module is configured to communicate with a PCI bus; and
  a configuration management module operable to configure the PCI device according to two or more personalities, wherein each personality corresponds to a device function and a service corresponding to the device function, and wherein the configuration management module is configured to:
    receive a configuration access request from the bus interface module;
    determine a location of the PCI device using information derived from the configuration access request, wherein the location corresponds to a PCI slot from a plurality of PCI slots of a computing system, wherein each slot connects to a PCI bus in the computing system, and wherein each slot from the plurality of PCI slots is operable to accept the PCI device;
    select, using the location, a personality from the two or more personalities; and
    configure the PCI device according to the selected personality, wherein configuring includes initializing a configuration register of the PCI device with information related to the device function and the service, wherein initializing the configuration register enables operation of the device function and the service, and wherein configuring occurs prior to device discovery by the computing system.

2. The PCI device of claim 1, wherein determining the location includes extracting a requester identifier from the configuration access request, wherein the requester identifier identifies a processor that requested the configuration access request, and wherein the processor is identified by a root complex port.

3. A peripheral device comprising:
  a circuit configurable to operate according to two or more personalities, wherein each personality corresponds to a peripheral device function and a service corresponding to the peripheral device function;
  wherein the peripheral device is configured to:
    receive a configuration cycle;
    determining, using information included in the configuration cycle, a location of the peripheral device, wherein the location corresponds to a slot from a plurality of slots of a computing system, and wherein each slot from the plurality of slots is operable to accept the peripheral device;
    select, using the location, a personality from the two or more personalities; and
    self-configure according to the selected personality, wherein self-configuring includes initializing a configuration register of the peripheral device with information related to the peripheral device function and the service, wherein initializing the configuration register enables operation of the peripheral device function and the service, and wherein self-configuring occurs prior to device discovery by the computing system.

4. The peripheral device of claim 3, wherein the information included in the configuration cycle includes a requester identifier.

5. The peripheral device of claim 3, wherein the information included in the configuration cycle includes a bus number.

6. The peripheral device of claim 3, wherein the configuration cycle is part of a configuration access request.

7. The peripheral device of claim 3, further comprising:
  a secondary bus interface, wherein the secondary bus interface facilitates communication with a secondary bus;
  and wherein the peripheral device is further configured to:
    select an identifier, wherein the identifier is used to identify the peripheral device on the secondary bus, and wherein the identifier is selected using the location.

8. The peripheral device of claim 3, wherein the two or more personalities are different from each other.

9. The peripheral device of claim 3, wherein a first personality from the two or more personalities provides a same service as a second personality from the two or more personalities, wherein the service provided by the first personality has different capabilities than the service provided by the second personality.

10. The peripheral device of claim 3, wherein a first personality from the two or more personalities provides one service and a second personality from the two or more personalities provides multiple services.

11. The peripheral device of claim 3, wherein the peripheral device is a PCI device.

12. The peripheral device of claim 3, wherein, after the peripheral device has self-configured, the computing system configures the peripheral device according to the peripheral device function.

13. A method for configuring a peripheral device, comprising:
  receiving, by the peripheral device, a configuration cycle, wherein the peripheral device is configurable to operate according to two or more personalities, wherein each personality corresponds to a peripheral device function and a service corresponding to the peripheral device function;
  determining, using information included in the configuration cycle, a location of the peripheral device, wherein the location corresponds to a slot from a plurality of slots of a computing system, and wherein each slot from the plurality of slots is operable to accept the peripheral device;
  selecting, using the location, a personality from the two or more personalities; and
  configuring the peripheral device according to the selected personality, wherein the peripheral device self-configures, wherein self-configuring includes initializing a configuration register with information related to the peripheral device function and the service, wherein initializing the configuration register enables operation of the peripheral device function and the service, and wherein self-configuring occurs prior to device discovery by the computing system.

14. The method of claim 13, wherein the information included in the configuration cycle includes a requester identifier.

15. The method of claim 13, wherein the information included in the configuration cycle includes a bus number.

16. The method of claim 13, wherein the configuration cycle is part of a configuration access request.

17. The method of claim 13, further comprising:
selecting an identifier, wherein the identifier is used to identify the peripheral device on a secondary bus, and wherein the identifier is selected using the location.

18. The method of claim 13, wherein the two or more personalities are different from each other.

19. The method of claim 13, wherein a first personality from the two or more personalities provides a same service as a second personality from the two or more personalities, wherein the service provided by the first personality has different capabilities than the service provided by the second personality.

20. The method of claim 13, wherein, after the peripheral device has self-configured, the computing system configures the peripheral device according to the peripheral device function.

* * * * *